United States Patent
Shah et al.

(10) Patent No.: US 6,973,396 B1
(45) Date of Patent: Dec. 6, 2005

(54) METHOD FOR DEVELOPING A UNIFIED QUALITY ASSESSMENT AND PROVIDING AN AUTOMATED FAULT DIAGNOSTIC TOOL FOR TURBINE MACHINE SYSTEMS AND THE LIKE

(75) Inventors: Minesh Shah, Clifton Park, NY (US); Kotesh K. Rao, Pearland, TX (US); Bruce Norman, Charlton, NY (US); Robert J. Iasillo, Simpsonville, SC (US); Ajai Singh, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 10/855,985

(22) Filed: May 28, 2004

(51) Int. Cl.[7] .................. G01N 37/00; G06F 17/18; G01H 1/00
(52) U.S. Cl. ................ 702/81; 702/179; 73/660
(58) Field of Search ............... 702/81, 82, 84, 702/179, 182; 73/570, 649, 658, 660

(56) References Cited

U.S. PATENT DOCUMENTS 5,225,724 A * 7/1993 Scarra' et al .................. 326/16

2003/0034995 A1  2/2003 Osborn et al.

* cited by examiner

*Primary Examiner*—John Barlow
*Assistant Examiner*—Meagan S. Walling
(74) *Attorney, Agent, or Firm*—Nixon & Vanderhye P.C.

(57) ABSTRACT

A computer implemented process is provided for assessing and characterizing the degree of success or failure of an operational event of a machine system such as a fluid compressor machine or turbine machine or the like on a continuous numerical scale. The computer implemented process develops and tracks machine unit signatures, machine site signatures and machine fleet signatures to evaluate various operational events and provide fault detection. At least some sensor data acquired from the machine system during an operational event is transformed to correct or at least reduce variabilities in the data caused by ambient conditions and fuel quality. The transformed data is then analyzed using statistical methods to determine how closely the operational event conforms to an expected normal behavior and the information is used to develop a single comprehensive quality assessment of the event. By saving, tracking and updating operational event assessments over time, machine/component degradation may be recognized at any early stage and corrective action may be initiated in advance of a catastrophic failure.

25 Claims, 13 Drawing Sheets

Fig.2 Unit Specific Signature Generation

Site Specific Signature Generation

Fleet Specific Signature Generation

Anomaly Signature Creation

Fault-Isolation via Anomaly Database Matching

Real Time Implementation

Non-real time Processing (local and/or central)

Example Signal Data Plots

| Site | ID | Config | Event | Date | Status (Fleet) | Status (Site) | Status (Unit) |
|---|---|---|---|---|---|---|---|
| ABC | 2974... | MS7241FA+e, D... | MODE 4-6 TRANS... | 14 May'04-05:56 | ● 83.09 | ● 93.27 | ● 93.27 |
| ABC | 2974... | MS7241FA+e, DL... | START UP | 14 May'04-04:53 | ● 84.0 | ● 99.75 | ● 99.75 |
| ABC | 2974... | MS7241FA+e, DL... | MODE 4-6 TRANS... | 13 May'04-07:58 | ○ 75.73 | ● 99.27 | ● 99.27 |
| ABC | 2974... | MS7241FA+e, DL... | START UP | 13 May'04-06:33 | ● 83.25 | ● 99.75 | ● 99.75 |
| ABC | 2974... | MS7241FA+e, DL... | MODE 4-6 TRANS... | 12 May'04-06:26 | ○ 77.91 | ● 99.0 | ● 99.0 |
| ABC | 2974... | MS7241FA+e, DL... | START UP | 12 May'04-04:32 | ○ 77.75 | ● 99.75 | ● 99.75 |
| ABC | 2974... | MS7241FA+e, DL... | MODE 4-6 TRANS... | 11 May'04-07:01 | ○ 78.45 | ● 94.82 | ● 94.82 |
| ABC | 2974... | MS7241FA+e, DL... | START UP | 11 May'04-05:57 | ● 83.75 | ● 99.75 | ● 99.75 |
| ABC | 2974... | MS7241FA+e, DL... | MODE 4-6 TRANS... | 10 May'04-05:56 | ○ 75.73 | ● 96.0 | ● 96.0 |
| ABC | 2974... | MS7241FA+e, DL... | START UP | 10 May'04-04:52 | ● 83.75 | ● 99.75 | ● 99.75 |
| ABC | 2974... | MS7241FA+e, DL... | MODE 4-6 TRANS... | 09 May'04-05:55 | ○ 78.18 | ● 95.82 | ● 95.82 |
| ABC | 2974... | MS7241FA+e, DL... | START UP | 09 May'04-04:52 | ● 82.5 | ● 99.75 | ● 99.75 |
| ABC | 2974... | MS7241FA+e, DL... | MODE 4-6 TRANS... | 08 May'04-05:59 | ● 80.36 | ● 98.91 | ● 98.91 |
| ABC | 2974... | MS7241FA+e, DL... | START UP | 08 May'04-04:52 | ● 83.75 | ● 99.75 | ● 99.75 |
| ABC | 2974... | MS7241FA+e, DL... | MODE 4-6 TRANS... | 07 May'04-05:57 | ● 75.45 | ● 98.91 | ● 98.91 |
| ABC | 2974... | MS7241FA+e, DL... | START UP | 07 May'04-04:52 | ● 83.5 | ● 99.75 | ● 99.75 |
| ABC | 2974... | MS7241FA+e, DL... | MODE 4-6 TRANS... | 06 May'04-10:56 | ○ 78.45 | ● 98.82 | ● 98.82 |
| ABC | 2974... | MS7241FA+e, DL... | START UP | 06 May'04-08:02 | ● 76.25 | ● 99.75 | ● 99.75 |
| ABC | 2974... | MS7241FA+e, DL... | MODE 4-6 TRANS... | 04 May'04-12:57 | ○ 78.45 | ● 99.18 | ● 99.18 |
| ABC | 2974... | MS7241FA+e, DL... | START UP | 04 May'04-11:22 | ○ 79.5 | ● 99.75 | ● 99.75 |

● = red
○ = yellow
● = green

Example Event Assessment / Diagnostic Display Screen

Fig. 12

METHOD FOR DEVELOPING A UNIFIED QUALITY ASSESSMENT AND PROVIDING AN AUTOMATED FAULT DIAGNOSTIC TOOL FOR TURBINE MACHINE SYSTEMS AND THE LIKE

BACKGROUND OF THE INVENTION

For turbine electric power generation systems, large fluid compressor/pump systems and the like, a great number of sensor signals and operational data often needs to be acquired and analyzed to properly evaluate a particular significant operational "event" (e.g., operational "events" such as start-up operations, mode transfer events, FSNL-FSFL, etc.). Consequently, it is usually not possible to quickly perform and obtain an accurate assessment of such events. In addition, variations in ambient operating conditions and/or fuel quality result in inconsistent and inaccurate sensor readings. This makes comparisons of operational events from one operational "run" of a particular turbine/compressor system to the next (as well as comparisons between operational runs of different turbine/compressor systems) impracticable. Moreover, for the same reasons, these problems make it impracticable to attempt to compare an operational run of a particular turbine machine with any sort of standardized data indicative of a normal operation for that particular system. Consequently, operations personnel (e.g., field engineers, technicians, remote tuning and systems operations center personnel) often resort to relying solely on signals from an individual sensor or an individual system parameter to determine whether a particular turbine or compressor machine unit or component is operating below an appropriate safety limit or within a proper tolerance range—such limit/range often being based generally upon some known variability inherent to a particular machine's design fleet or upon some known consistent variability in the particular ambient operating conditions or fuel type/quality.

Although fault detection mechanisms and statistical tests useful for analyzing and evaluating operational events of complex machine systems and equipment have been developed, the known conventional procedures for such have significant efficiency limitations and often produce inaccurate or erratic results. A much more accurate and efficient approach for developing quality assessments and providing fault diagnosis of operational events occurring in complex compressor/pump and turbine machine systems is needed and is highly desirable.

BRIEF DESCRIPTION OF THE INVENTION

A new and improved approach toward developing a quality assessment for complex wind/steam/gas turbine systems, fluid compressor/pumping systems, generators, and the like is described. This approach combines the benefits of disparate statistical methods (such as, for example, the "matched filter" and the "multiple model hypothesis test") to result in more accurate analysis and assessment of a particular machine/system operational event. In addition to providing a unified quality assessment, the overall system quality as well as individual component quality is examined for deviations, which may correspond to or at least be indicative of specific faults. By comparing recent event signatures to selected archived signatures, system and component faults can be readily detected, identified and diagnosed.

In one aspect, a computer implemented method is described herein for characterizing the relative degree of success or failure (i.e., providing a quality assessment) of a particular machine/system operational event by rating it over a continuous (contiguous) type assessment scale—as opposed to the more conventional "pass/fail" or "trip/no-trip" binary type assessment. It is contemplated that using a continuous type scale for characterizing a relative degree of "success" or "failure" of an operational event will better assist field technicians and operations personnel in assessing and communicating the quality of a particular operational event. Another aspect of this computer implemented assessment method is that it assesses and characterizes not only the quality of the system response to an operational event, but also the quality of individual component response to the event—thus enabling field engineers to identify and localize potential faults or failures within the machine system.

Basically, the exemplary computer implemented quality assessment method described herein realizes the above improvements and benefits through a process of analyzing acquired system sensor and/or operational parameters data in conjunction with information concerning the existing ambient conditions and the fuel type/quality in a manner that eliminates or at least significantly reduces variability in the acquired data that is introduced by such known factors. Based on the premise that a set of "corrected" parameters may be used to compensate for a known variability in operating conditions, one aspect of the disclosed assessment method is to use such a set of corrected parameters to transform sensor and/or system operational parameter data collected during the operation of a particular machine/system into a "corrected parameter space" that effectively eliminates, or at least reduces, variability in the acquired data that is caused by known variations in ambient conditions and fuel type/quantity. Such transformed/corrected data corresponding to one or more operational variables of the system is then statistically analyzed and compared with a set of expected ("normal") operational values and the results are used to diagnose and predict faults.

In a further aspect of the exemplary computer implemented quality assessment method disclosed herein, available non-transformed (e.g., uncorrectable) operational event data may also evaluated in a manner which lessens the degree of confounding which may occur with the transformed/corrected data. In the example implementation, separate quality assessments of the turbine operational event are developed (i.e., an assessment of the transformed data and an assessment of the non-transformed data). These assessments are then combined to provide a single overall "unified" comprehensive operational event assessment. This unified comprehensive operational event assessment is then tracked and updated over time and may be used to provide an early warning of machine/component degradation for a particular turbine system. In yet a further aspect of the disclosed method, event signatures corresponding to different anomalies produced by known faults may be saved or archived so that subsequent outlier event signatures can be diagnosed by being matched to an archived anomaly signature to identify a particular problem or component failure. In still yet a further aspect of the disclosed method, quality assessments of operational events and/or particular system operational variables may be performed either in real-time while the monitored system is operational or implemented by recording system sensor data at predetermined times followed by a post-processing of the acquired data at a remote facility.

In at least one non-limiting example implementation discussed and illustrated herein, a numerical quality assessment value for a particular operational event and/or a particular operational variable is computed and the event may be deemed as a "success" or "failure" based upon the degree to which the acquired transformed/corrected sensor data falls within certain predetermined numerical limits or "bounds" defining different quality categories. The operational event is then classified accordingly into one of three different categories (e.g., red, yellow or green) that are intended as being generally indicative of its relative operational "success" or "failure" (e.g., "red"= failure; "green"=success). Numerical quality assessment values that are computed for different operational variables and/or events are saved and also used in developing an overall quality assessment for a particular gas turbine system.

The quality assessment method disclosed and described herein may be used to provide a unified quality assessment of operational events, as well as provide component fault detection/identification, for a variety of different types of complex machine and machine systems such as power generator systems and turbine systems including wind/steam/gas turbines and/or fluid compressor/pump systems such as oil/gas pumping systems. Although a gas turbine system is referenced and illustrated throughout the discussion of the invention herein, that particular example serves solely as one non-limiting example application. The computer implemented quality assessment and fault diagnostic method disclosed herein is not intended to be limited solely for use with gas turbine systems but is also intended as applicable for use in assessing and diagnosing most types of turbine machines/fleets/systems, compressors, pumps and other complex machine systems.

BRIEF DESCRIPTION OF THE DRAWINGS

Other advantages and objects of the present invention will be described in detail with reference to the accompanying drawings, in which:

FIG. 12 is an example computer output screen display for the computer implemented operational event quality assessment/diagnostic process for evaluating a turbine system operational event.

DETAILED DESCRIPTION OF THE INVENTION

Figure 1:
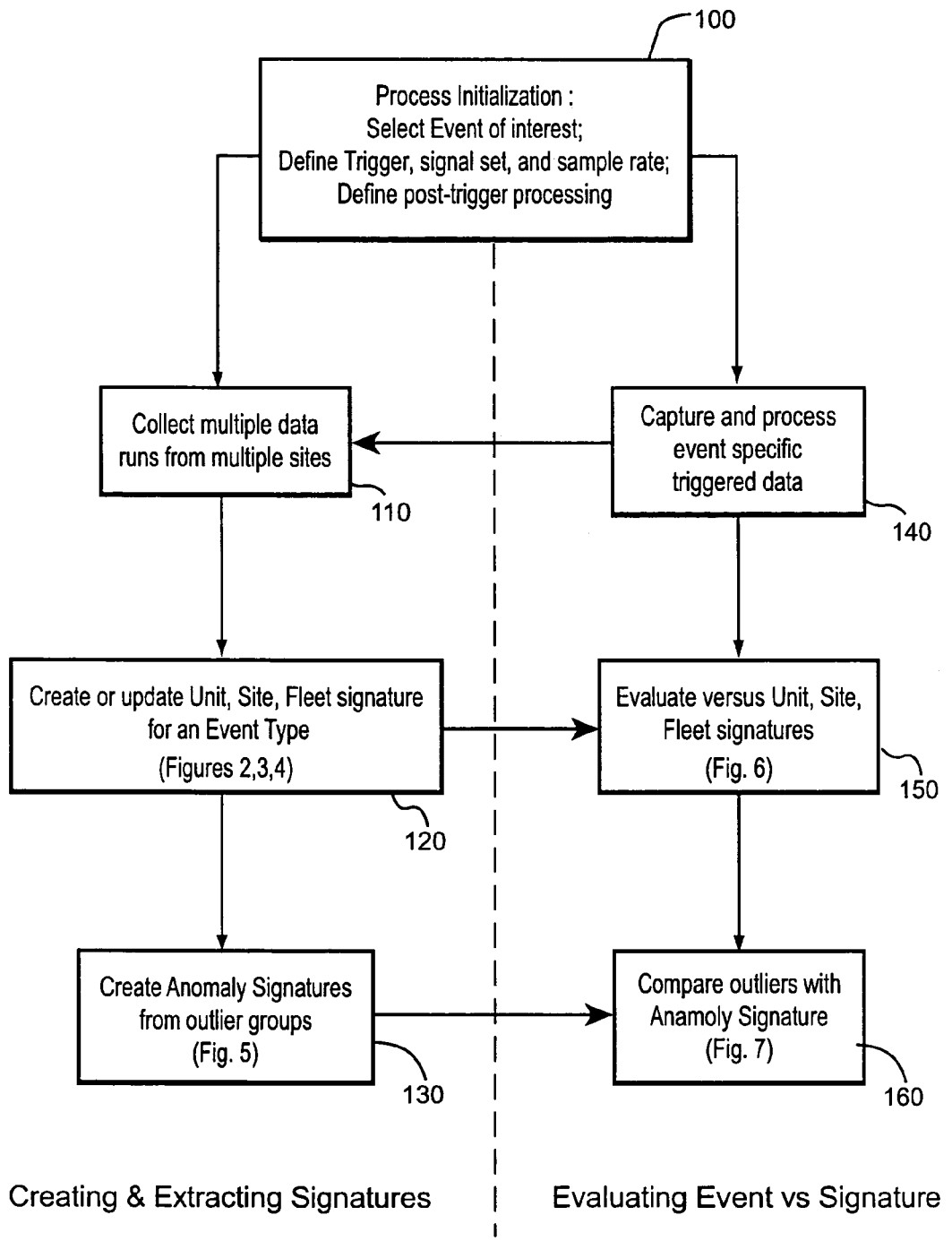
FIG. 1 is a procedural diagram providing a basic overview of the operational event quality assessment/diagnostic process.

Operational events which take place in large/complex turbine systems, fluid compressor/pumping systems and the like are often characterized by one or more operational variables that may be influenced by uncontrollable commonplace variations in ambient conditions and fuel type/quality. A computer implemented process is provided for developing a unified quality assessment of one or more of such turbine operational events despite such uncontrollable variations. As briefly outlined above, a unique approach is described that involves removing, or at least reducing, the effects of variations in ambient operating conditions and variations in fuel quality by initially performing a mathematical transform upon at least some of the acquired system/sensor data to effectively transform the data into a "corrected" parameter space, after which both transformed and non-transformed data corresponding to certain predetermined operational variables are statistically analyzed using, for example, matched filter, multiple model hypothesis tests, fault detection, etc. From that statistical analysis, a numerical quality assessment value for the event is developed and then compared with a pre-determined "expected" operational value or range. This expected value may be initially selected, for example, based on known variations particular to a specific commercial line, fleet type/model of machine or system (e.g., turbine fleet). For example, in a turbine power generating system, as additional operational data from a particular turbine site is acquired over time, this expected value is modified and continually updated so as to become more characteristic of that particular turbine system or a specific turbine unit at that site or a particular component of that turbine machine unit. The specific parameter corrections applied in any one incidence are not necessarily limited to the conventional corrections known in the industry, but may also include parameter corrections developed specifically for particular sensors such that the known/observed variation(s) due to ambient conditions/fuel quality is reduced in that particular sensor reading. Individual assessments of the same operational events made at different times and/or from different gas turbines of the same mechanical fleet may also be combined to develop a more complete and comprehensive assessment that effectively covers the entire duration of a particular turbine operational event in a contiguous manner.

In one non-limiting example implementation of the method for developing a unified quality assessment, as illustrated herein for a gas turbine system, a computer processor or machine controller is programmed to perform one or more of the following operations:

acquiring and/or recording pertinent sensor data which characterizes the operation of the turbine during occurrence of an operational event, wherein the acquired sensor data includes information concerning the ambient operating conditions of the turbine and/or the fuel quality/type;

using a predetermined mathematical transform or a set of correction parameters to transform/correct acquired sensor data (e.g., by transforming or converting the data into a corrected parameter space) to effectively remove or correct for variability in the data that results from variations in ambient operating conditions at the turbine and/or fuel type/quality;

comparing both the transformed data and other non-transformed sensor data (e.g., unaffected acquired sensor data) relevant to the operational event with a predetermined expected or "normal" data value or range and determining a statistical degree to which that data matches the expected value/range—i.e., comparisons are made against an expected "normal" value using both the non-transformed data and the transformed data as acquired from operational events occurring on the same turbine machine and/or from operational events occurring across different turbine machines to determine the degree to which the data falls within or outside of certain predetermined bounds—the comparing process being basically statistical in nature in that it utilizes variability information in the transformed or non-transformed parameter space (depending on the operational variable(s) being considered); in this example, the expected "normal" value/range may be initially based upon historical (e.g., archived information for a particular turbine fleet (a "fleet" being a group of turbine machine production models having the same or similar configuration, size, etc.) and as additional data is subsequently collected for a particular operational event occurring on a particular turbine machine or component, the corresponding expected "normal" value is updated/adjusted to more accurately reflect the turbine's actual "normal" operation during that particular type of operational event;

classifying the data into a plurality of quality categories (e.g., "red", "yellow" and "green") according to the statistical degree to which the data matches the expected value/range;

combining the statistical evaluations of both transformed data and non-transformed data into a single comprehensive quality assessment value that is indicative of the quality of a particular turbine operational event—i.e., an information "fusion" process is implemented which combines all individual comparison statistics to produce an overall comprehensive quality metric of the operational event (e.g., a comprehensive numeric quality assessment value) that is contiguous and continuously evolving (as opposed to being a static, non-evolving, binary-type indication of event quality, e.g., "good/no-good" or "pass/fail"); and continuously tracking and updating the developed comprehensive event assessment value over time and identifying when a deviation in the assessment value violates a pre-determined threshold/range so that the cause of the deviation may be identified and appropriate corrective action initiated before a severe problem develops; in this regard, the assessment tracking procedure is preferably made somewhat tolerant of noise present in the event assessment data so as to reduce the occurrence of false positives.

As will become evident from the non-limiting exemplary application discussed below, the method for developing a unified quality assessment described herein may be implemented via computer either at the turbine system site in real-time during the occurrence of a particular operational event or as part of a subsequent diagnostic process conducted remotely after storing and forwarding the acquired event data over a digital communications network to a central diagnostic site.

Referring first to FIG. 1, a procedural diagram is illustrated which provides an overview of the operational event quality assessment process. As indicated at procedural block 100, the process begins with the selection of a particular operational event of interest. Ideally, a technical systems expert/analyst familiar with the particular system being evaluated, e.g., one who has an through understanding of the physics of the system and its various processes, will be instrumental in selecting or predefining at least the following initial parameters:

a "trigger" to start data acquisition a list of signals/sensors to be sampled a rate at which to sample the signals/sensors Data acquisition may be performed manually, at least initially, but preferably would be automated through the implementation of an appropriate automatic data capturing process. Data acquisition is initiated and a data file created whenever a predetermined "trigger" condition is met. The "trigger" is used as an alignment point for analysis of the acquired signal/sensor data. There may be multiple points or signals in the data that may be used as a trigger from which re-alignment of the acquired data may also be beneficial. This approach to data acquisition ensures that any signature creation has a consistent beginning point from which all subsequent data can be analyzed. An exemplary data acquisition process may also include:

Normalizing any sensor or signal as separate value while retaining the original information;

Filtering any signal or signals as needed; and

Zero shifting any sensor drift if possible.

The described procedures for data acquisition correspond to a single operational event "run" which may be iteratively performed for collecting data for a plurality of data runs from multiple sites as indicated in procedural block 110.

As indicated at procedural block 120 and 130, prior to doing a quality assessment fleet, site and unit-specific signatures and corresponding thresholds are created for a given event of a particular configuration type.

Many signals from the system sensors will be appropriate candidates for transformation to a corrected parameter space to reduce/remove the effects of ambient, fuel and machine state variability. However, for certain signals, a correction/transformation to remedy such effects will not be available or appropriate. For the signal types which can be corrected, the corresponding corrected parameters are computed (e.g., the data is transformed to a corrected parameter space), as indicated in block 120. For those signals that do not have appropriate correction parameters but which may be critical for event assessment, the corresponding signal signatures may at least be checked to insure that the acquired data falls within pre-specified range or bounds (block 120).

Developing corrections is done by using domain knowledge of the process, identifying the variables or signals that characterize the process, using the physics of the process to determine either dimensionless quantities that characterize the process or those that have minimal effect of the ambient conditions like temperature, pressure, humidity etc. when plotted against another virtual variable.

A signature associated with an operational event for a particular equipment type/configuration is formed from a set of sub-signature plots of predetermined sensor signals or parameters (e.g., Fuel or turbine acceleration), plotted in an appropriately corrected domain for that signal. Each sub-signature plot is characterized by a nominal value having associated quality thresholds boundaries/ranges (e.g., red, yellow and green) defined about the nominal value. The event signature is initially created by overlaying the sub-signature plots created from multiple data sets of acquired sensor or monitored parameter data and determining the nominal or representative plot for each sub-signature. (See examples shown in FIG. 10.) The validity of the corrections and corrected space applied to data for a given event is determined by utilizing data acquired from several machine units and developing probability distributions indicative of the corresponding range of variations across the fleet.

Every time, a new event data set is obtained, it is transformed into the corrected space and then matched versus each of the sub-signature plots. A quantitative measure of the fit versus each of the sub-signature plots is obtained, and a single assessment of fit versus the signature is computed as a probabilistically weighted average. Accordingly, event signatures are developed from parameter plots that correspond to the acquired sensor data, at least some of which is corrected by utilizing one or more corrected parameter coefficients which reduces or eliminates variabilities in the sensor data caused by ambient conditions and/or fuel type/quality.

As indicated in block 150, a numerical quality assessment value is then determined for the event based upon comparison with a pre-determined expected value/range and the event is then accordingly classified into an appropriate quality assessment category. All corrected (transformed) parameter data and non-corrected (non-transformed) data are combined using, for example, a weighted average or rule-based averaging. This combined overall assessment is then classified into a "red," "yellow" or "green" quality category. As indicated at block 160, signals that fall into "suspect" categories (e.g., "red" or "yellow") are tagged for further analysis to identify potential operational problems. Ultimately, the combined overall numerical quality assessment, as well as the quality assessment of signals/parameters that fall into suspect categories, are tracked over time to provide an early warning and identification of component or system degradation, component and system modifications and potential failures, as indicated in block 160.

Figure 2:
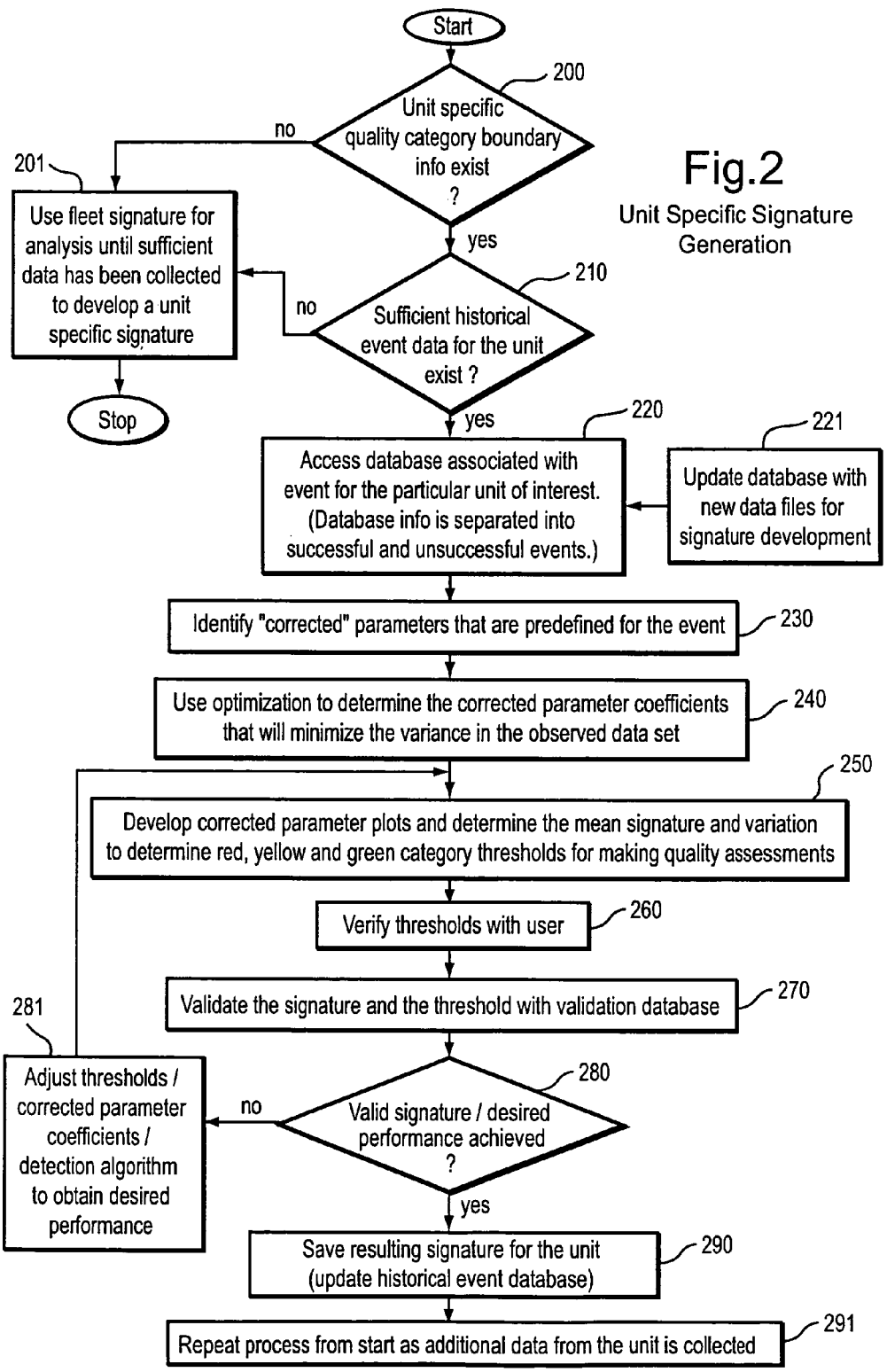
FIG. 2 is a process flow diagram illustrating example procedural blocks implemented on a computer/controller for developing and updating a turbine unit-specific signature of a turbine operational event.

In FIG. 2, a process flow diagram illustrates example procedural blocks implemented by a computer or system controller for developing a "unit-specific" signature for an operational event occurring on a single turbine machine at a turbine system site (at any one particular turbine system site the turbine system may include more than one turbine machine unit). This process may be implemented by a computer located at the turbine system site, such as the local turbine controller, or it may be implemented by a remotely located processing system which receives data from the turbine controller. Initially, as indicated at procedural block 200, it is determined whether any particular quality category range or "boundary" information exists for sensor data originating from the specific turbine system site being assessed. As indicated at block 201, if no site-specific quality category ranges or boundary information exists, a fleet signature or other generic signature may initially be used for performing the quality assessment analysis until sufficient data is collected over time to develop an adequate site-specific event signature.

Preferably, a database containing historical operational event data for one or more turbine systems (or other fluid compressor systems or the like) is maintained and updated with new data at regular intervals (e.g., block 221). Such a database may also contain corrected parameters that are predefined for various operational events corresponding to specific turbine units located at different sites. Assuming that sufficient previously recorded historical event data exists for a particular turbine unit of interest (block 210), database files containing historical operational event data for the unit and/or for the particular site where the unit is situated are accessed (block 220) to identify corrected parameters that are predefined for the particular operational event (block 230). A conventional data set optimization is then performed to determine corrected parameter coefficients that will minimize the variance in the observed data set (block 240). Next, as indicated at block 250, corrected parameter plots are developed and the mean signature and variation are determined using, one or more conventional statistical methods (e.g., matched filter and multiple model hypothesis test). Using this information, quality assessment category "thresholds" or "boundaries" are computed for use in classifying signal data into one of a plurality of quality categories (e.g., red, yellow and green). Before being applied, these quality range boundaries/thresholds may be initially set or verified by a system operator or user, as indicated at block 260. Next, the signature and the threshold may be validated by comparison with archived data stored in a validation database (block 270). If a valid signature or the desired performance has been achieved, the resulting signature associated with that turbine unit and saved (presumably in a historical operational event database) so that it may also be accessed and used by field personnel (block 290). Otherwise, as indicated at block 281, the thresholds and/or corrected parameter coefficients (and/or the detection algorithm) is adjusted and blocks 250 through 280 are repeated until the desired performance is obtained. This entire process may be repeated as additional or new data from the turbine unit is collected, as indicated in block 291.

Figure 3:
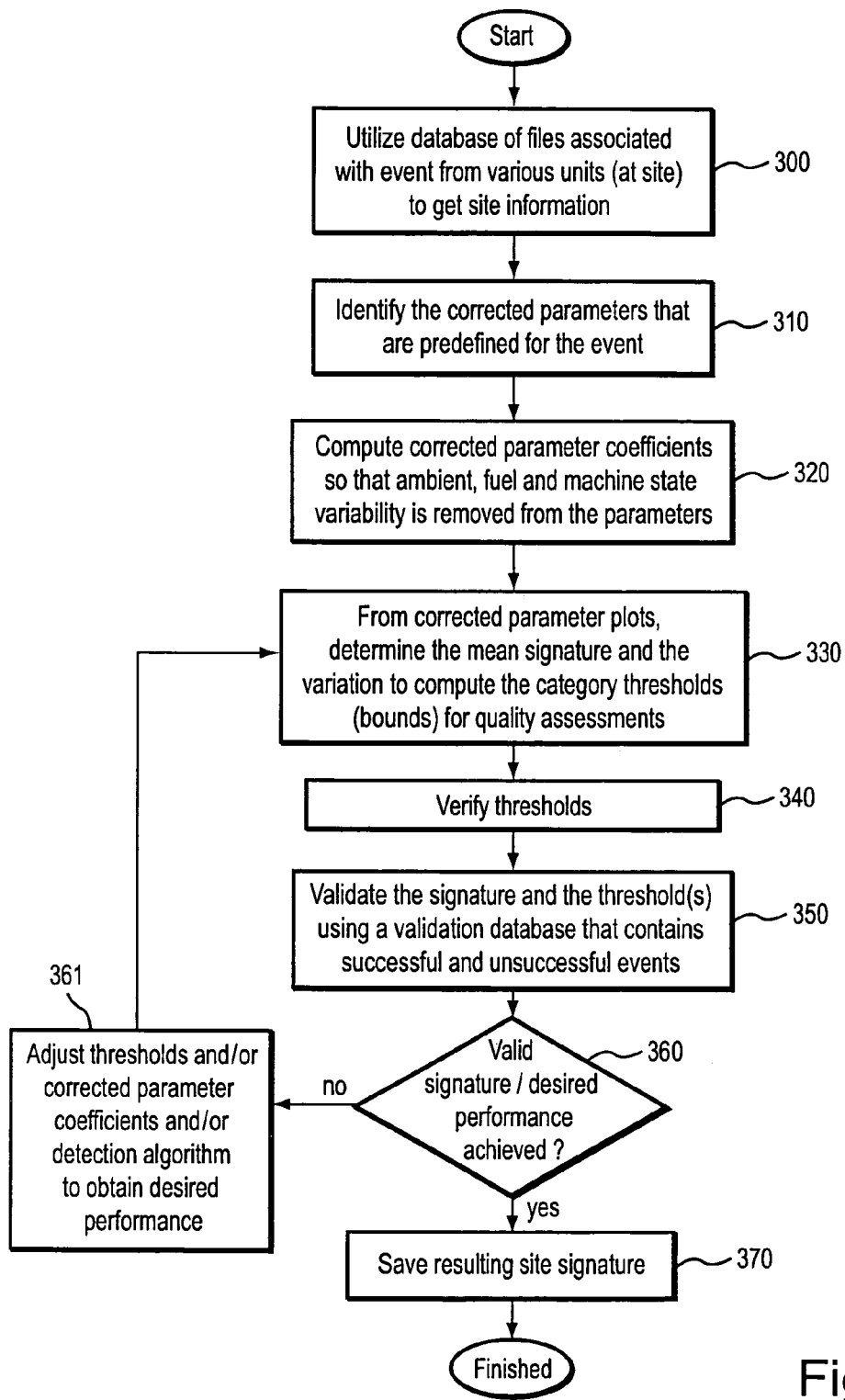
FIG. 3 is a process flow diagram illustrating example procedural blocks implemented on a computer/controller for developing and updating a turbine site-specific signature of a turbine operational event.

FIG. 3 shows a process flow diagram illustrating example quality assessment procedural blocks implemented on a computer/controller for developing a turbine system site-specific signature of a turbine operational event. Preferably, a historical database consisting of operational event files corresponding to turbine systems located at one or more sites exists and is maintained to serve as a source of information concerning the turbine units at a particular site. Initially, as indicated in block 300, this database is accessed to obtain generalized operationally corrected parameters and information corresponding to the turbine units being analyzed at a particular site. Corrected parameters that are predefined for the particular operational event at that site being assessed are identified, as indicated in block 310, and corrected parameter coefficients are computed based on this information, as indicated in block 320. Next, as indicated in block 330, a mean signature and variation is determined from the corrected parameter plots and used to compute the three red, yellow and green category quality thresholds (bounds) for defining a quality assessment. Next, the computed thresholds are verified with a system operator/user, as indicated at block 340. The signatures and the thresholds are then validated using a validation database that contains a record of successful and unsuccessful operational events, as indicated in block 350.

As indicated in block 360, if a valid signature or desired performance was achieved, then the results are saved as an updated site-specific operational event signature (preferably in a historical operational event database) and made available for future use and/or access by field personnel, as indicated in block 370. If a valid signature is not obtained, the monitored events may be partitioned into different sets, and a signature and the corresponding thresholds and boundaries may be determined individually for each set. In practice, this may correspond to a change over time in the signature for a specific unit or of different configurations across multiple units. Accordingly, the thresholds and/or the corrected parameter coefficients (and/or the particular detection process used) are adjusted and recomputed as indicated at blocks 361 and 330.

Figure 4:
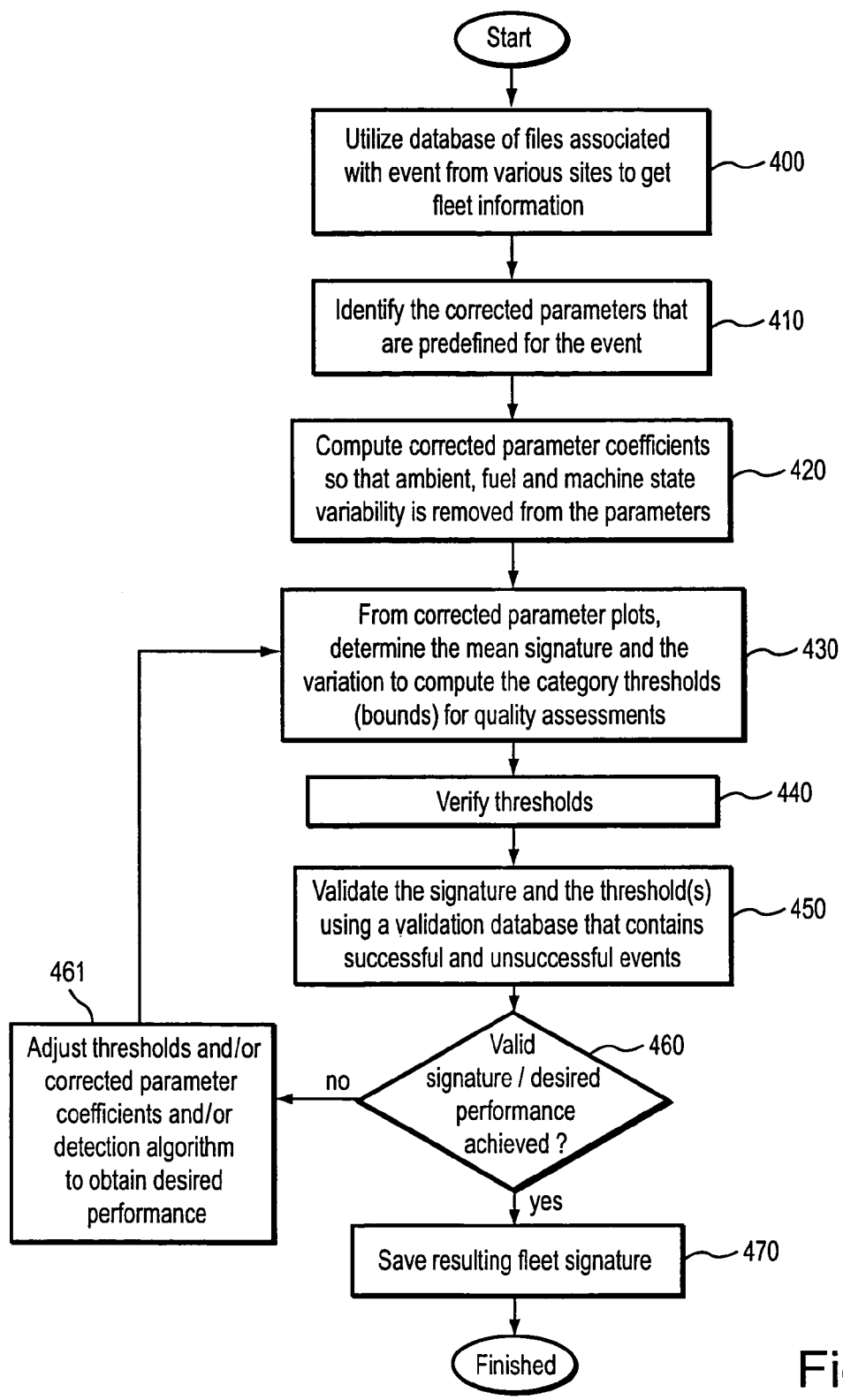
FIG. 4 is a process flow diagram illustrating example procedural blocks implemented on a computer/controller for developing and updating a turbine machine fleet-specific signature of a turbine operational event.

FIG. 4 shows a process flow diagram illustrating example procedural blocks implemented on a computer/controller to develop a turbine fleet-specific signature of a turbine operational event. In practice, creation of a fleet-specific signature may be performed before the creation of a unit-specific signature after collecting fleet-wide data sets.

Preferably, a historical database of operational event files associated with turbine systems and various sites exists and is maintained to provide turbine fleet information. Initially, as indicated in block 400, this database is accessed to obtain generalized operationally corrected parameters and information corresponding to the particular type of gas turbine machine being analyzed. Corrected parameters that are predefined for the particular operational event being assessed are identified, as indicated in block 410, and corrected parameter coefficients are computed based on this information, as indicated in block 420. Next, as indicated in block 430, a mean signature and variation is determined from the corrected parameter plots and used to compute the three red, yellow and green category quality thresholds (bounds) for defining a quality assessment. Next, the computed thresholds are verified with the user, as indicated at block 440. The signatures in the thresholds are then validated using a validation database that contains a record of successful and unsuccessful operational events, as indicated in block 450.

As indicated in block 460, if a valid signature or desired performance was achieved, then the results are saved as an updated fleet operational event signature (preferably in a historical operational event database and made available for future use and/or access by field personnel, as indicated in block 470. If a valid signature is not obtained, the monitored events may be partitioned into different sets, and a signature and the corresponding fleet thresholds and boundaries may be determined individually for each set. In practice, this may correspond to a change over time in the signature for a specific unit or of different configurations across multiple units. Accordingly, the thresholds and/or parameter coefficients are adjusted and recomputed as indicated at blocks 461 and 430.

Figure 5:
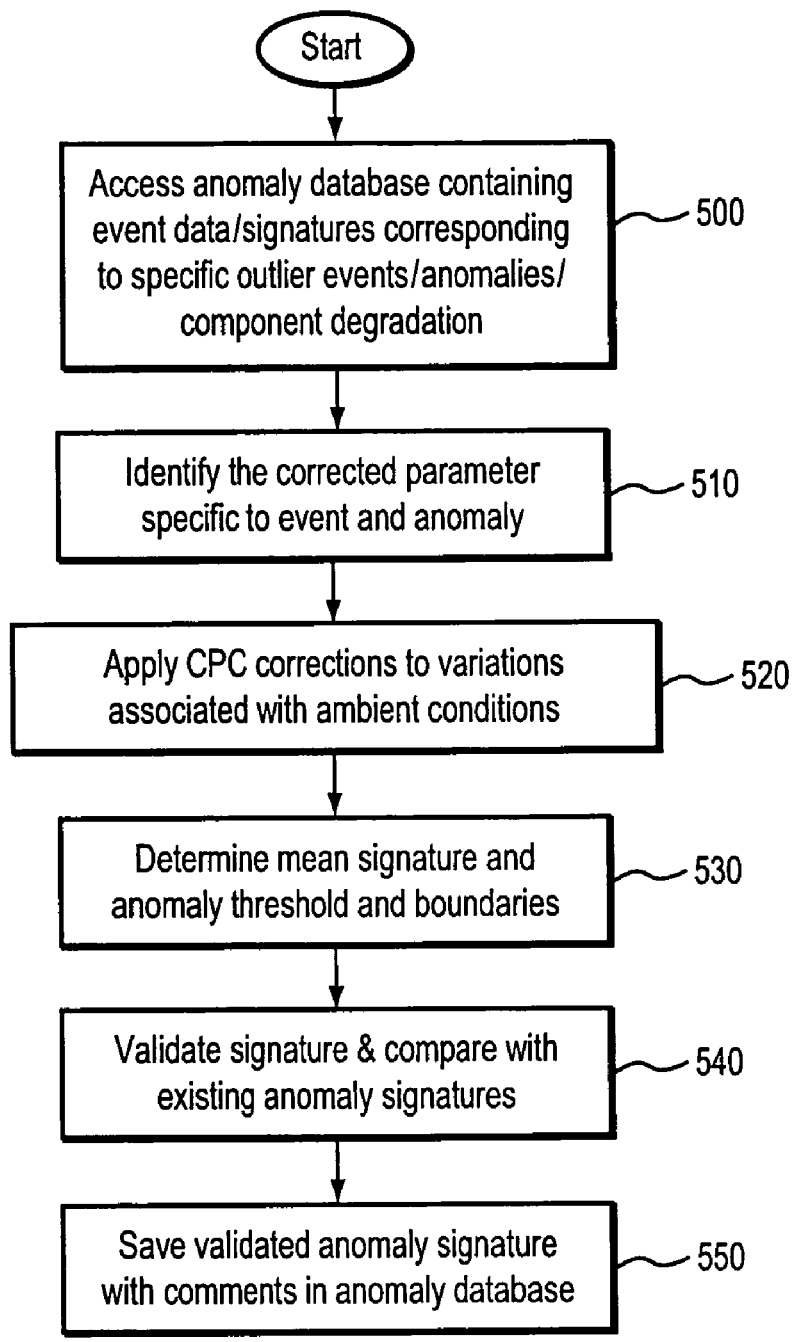
FIG. 5 is a process flow diagram illustrating example quality assessment procedural blocks implemented on a computer/controller for developing anomaly fault signatures associated with site and/or fleet-wide operational events.

Although not mentioned above in the detailed discussion of FIG. 2, 3 or 4, the sensor data and/or parameter data corresponding to various "anomalous" or outlier operational events is also saved in the historical database (e.g., at procedural blocks 290, 370, 70) and flagged as data which comprise an anomaly event database. This anomaly event database may then be used for troubleshooting purposes by providing a means for identifying those operational events that evidence a "best fit" relationship with an anomalous event signature/data previously saved in the anomaly event database. An example process for creating an anomaly signature and/or an individual component fault signature is illustrated by the procedural flow diagram of FIG. 5. The diagram shows example procedural blocks which may be implemented on a computer processor/controller as part of the operational event quality assessment process to develop both system and individual component anomaly fault signatures associated with a particular unit, site or fleet-wide operational events.

As indicated at block 500, specific storage space or files in a historical database in a computer memory are set up or allocated for use as an anomaly event database. The corrected parameter specific to the event and anomaly is identified and CPC corrections to variations associated with ambient conditions are applied, as indicated in procedural blocks 510 and 520. The mean signature and the anomaly threshold/boundaries are determined, as indicated in block 530, and the signature is validated then compared against existing anomaly signatures stored in the anomaly database, as indicated in block 540. Next, assuming the validated anomaly signature is not currently in the anomaly database, it is saved along with appropriate identifying information or comments, as indicated in block 550.

Figure 6:
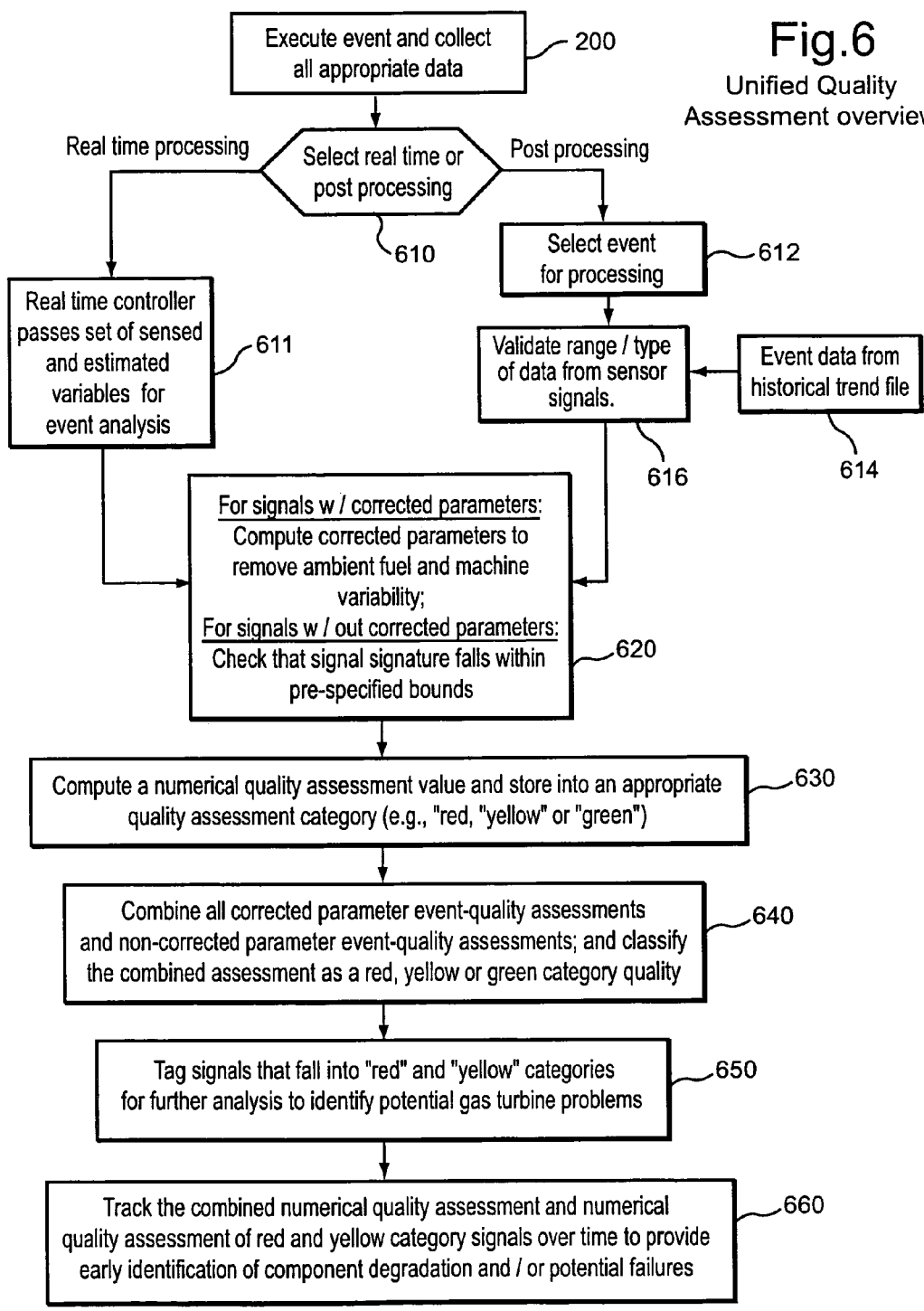
FIG. 6 is a process overview flow diagram illustrating example quality assessment procedural blocks implemented on a computer/controller for the evaluation of unified quality assessments of an operational event with respect to unit, site and fleet signatures.

Referring to FIG. 6, a procedural flow diagram is shown which may serve as a general overview of an exemplary computer/controller implementation of the operational event quality assessment process. As indicated in procedural block 600, a particular operational event is initiated on the turbine and operational parameter data from various sensors is monitored during and throughout the operational event. If real-time processing is employed (block 610), an on-site real-time turbine unit controller (or a comparable remote monitoring system) is configured to recognize the particular type of operational event taking place (e.g., start-up, mode transfer, etc.) and verify that valid signals are being acquired from the various turbine sensors (block 611). Sets of appropriately verified sensor signals (i.e., verified as appropriate for the particular operational event) are immediately processed to provide real-time analysis of the event. This real-time quality assessment analysis may either be implemented locally by the turbine system site controller itself or the acquired sensor data may be transmitted via an appropriate digital communications network to a remote real-time processing facility.

As indicated at procedural block 610, a "post-processing" arrangement may also be implemented wherein one or more system events are monitored and all of the appropriate sensor data during each event is collected and saved in a historical event/trend file which may be stored on site or at a remote facility. Subsequently, as indicated at block 612, a particular operational event may be selected for analysis. If it exists, all prerecorded pertinent data corresponding to that particular event is retrieved from a historical event/trend file (block 614) and the sensor signal data may then be examined and verified as valid (block 616) before being passed on for further processing.

Many signals from the system sensors will be appropriate candidates for transformation to a corrected parameter space to reduce/remove the effects of ambient, fuel and machine state variability. However, for certain signals, a correction/transformation to remedy such effects will not be available or appropriate. For the signal types which can be corrected, the corresponding corrected parameters are computed (e.g., the data is transformed to a corrected parameter space), as indicated in block 620. For those signals that do not have appropriate correction parameters but which may be critical for event assessment, the corresponding signal signatures may at least be checked to insure that the acquired data falls within pre-specified range or bounds (block 620). Accordingly, event signatures are developed from parameter plots that correspond to the acquired sensor data, at least some of which is corrected by utilizing one or more corrected parameter coefficients which reduces or eliminates variabilities in the sensor data caused by ambient conditions and/or fuel type/quality.

As indicated in block 630, a numerical quality assessment value is then determined for the event based upon comparison with a pre-determined expected value/range and the event is then accordingly classified into an appropriate quality assessment category. Next, as indicated at block 640, all corrected (transformed) parameter data and non-corrected (non-transformed) data are combined using, for example, a weighted average or rule-based averaging. This combined overall assessment is then classified into a "red," "yellow" or "green" quality category according to. As indicated at block 650, signals that fall into "suspect" categories (e.g., "red" or "yellow") are tagged for further analysis to identify potential operational problems. Ultimately, the combined overall numerical quality assessment, as well as the quality assessment of signals/parameters that fall into suspect categories, are tracked over time to provide an early warning and identification of component or system degradation, component and system modifications and potential failures, as indicated in block 660.

Figure 7:
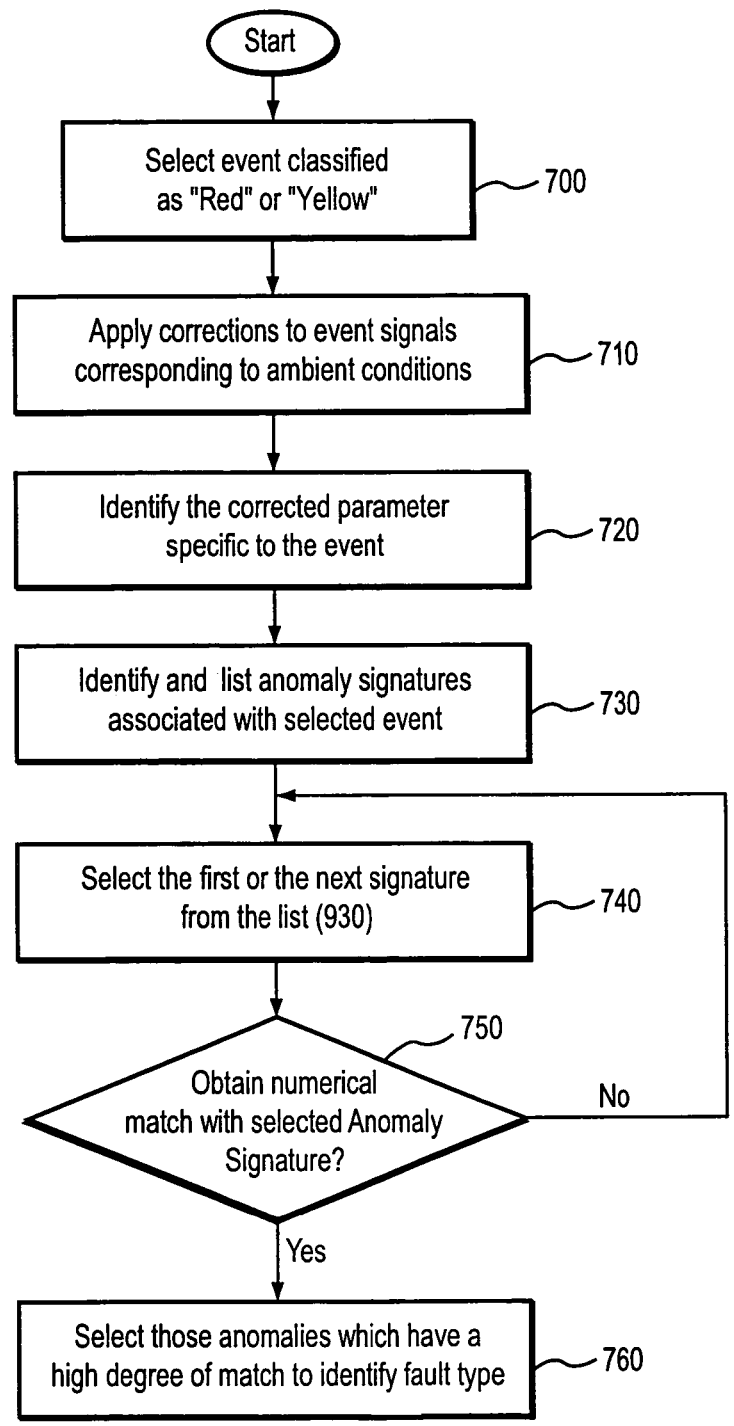
FIG. 7 is a flow diagram illustrating an example computer implemented process for providing automated fault detection/identification based on the operational event quality assessment process.

FIG. 7 illustrates an example computer implemented process blocks for providing automated fault detection and diagnosis/identification that operates as part of the basic quality assessment processing described above. As previously discussed with respect to FIGS. 2 through 6, a database of outlier anomaly event signatures is developed during the quality assessment processing. This database may also include historical/archival operational event data indicative of component degradation and fault signatures corresponding to both individual machine units and/or specific machine fleets. For this aspect of the invention, operational events that fall into categories indicative of poor or bad quality, such as the "red" and "yellow" quality classifications, are treated as suspect events and are used as candidates for detecting and identifying system and component faults.

As indicated at blocks 700 through 720, a first candidate operational event is selected for examination and, if not already done, corrections for ambient conditions are applied to the event signals and a corrected parameter specific to that operational event is identified. A list of anomaly signatures associated with the selected event is formed (block 730) and then the identified event parameter is compared with each of the anomaly signatures in the list to determine if a close match exists (blocks 740 and 750). Event parameters and anomaly signatures exhibiting a high degree to matching are then used to identify the particular fault type and component or system malfunction.

Figure 8:
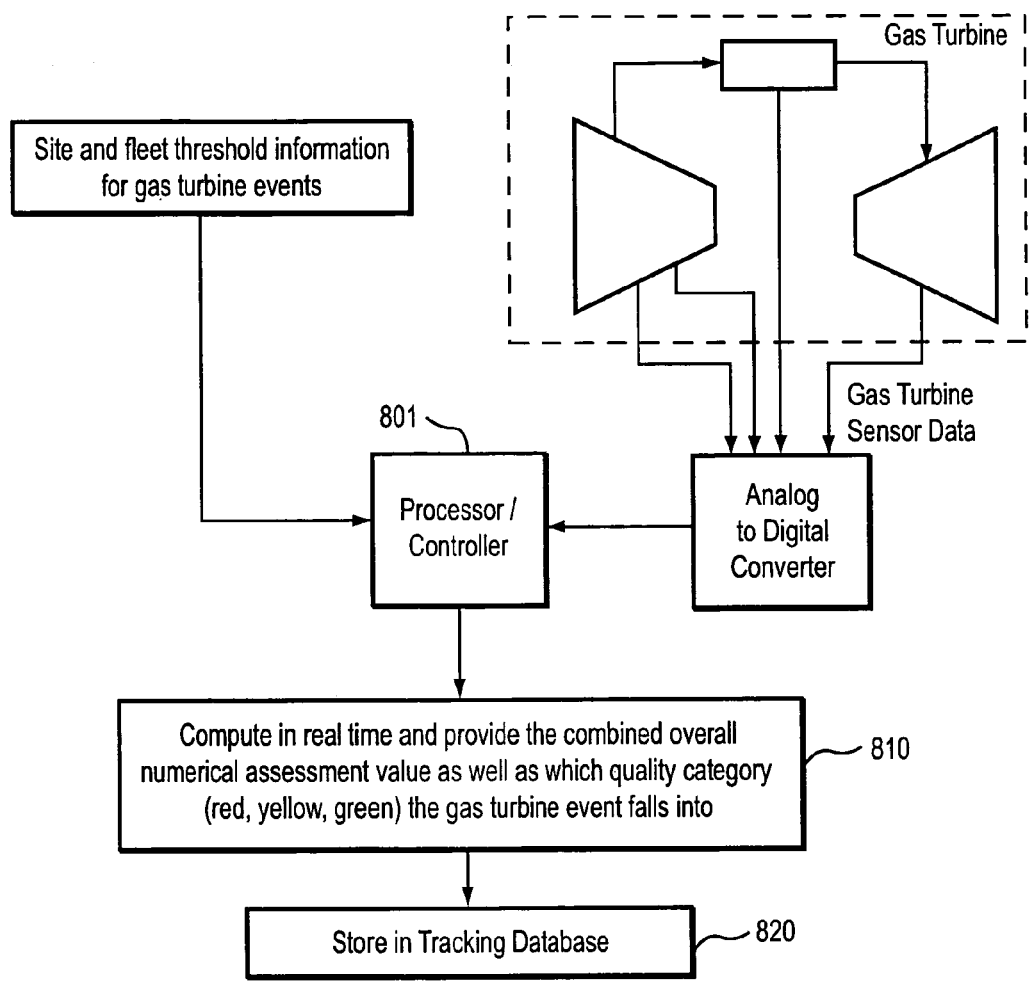
FIG. 8 is a flow diagram illustrating an example real-time local computer processing implementation of the operational event quality assessment process for a gas turbine system.

Referring now to FIG. 8, a flow diagram is shown which illustrates an example real-time implementation of an operational event quality assessment process for a gas turbine. In this example, turbine sensor data from an operational event is provided to the local or a remote computer processor/turbine-controller 801. Using site and fleet signal threshold information obtained from a historical event database, processor/controller 801 computes a combined overall numerical assessment quality value in real-time and determines which quality category (red, yellow, green) the operational event is classified (block 810). This information is then saved in a historical tracking database as indicated at block 820.

Figure 9:
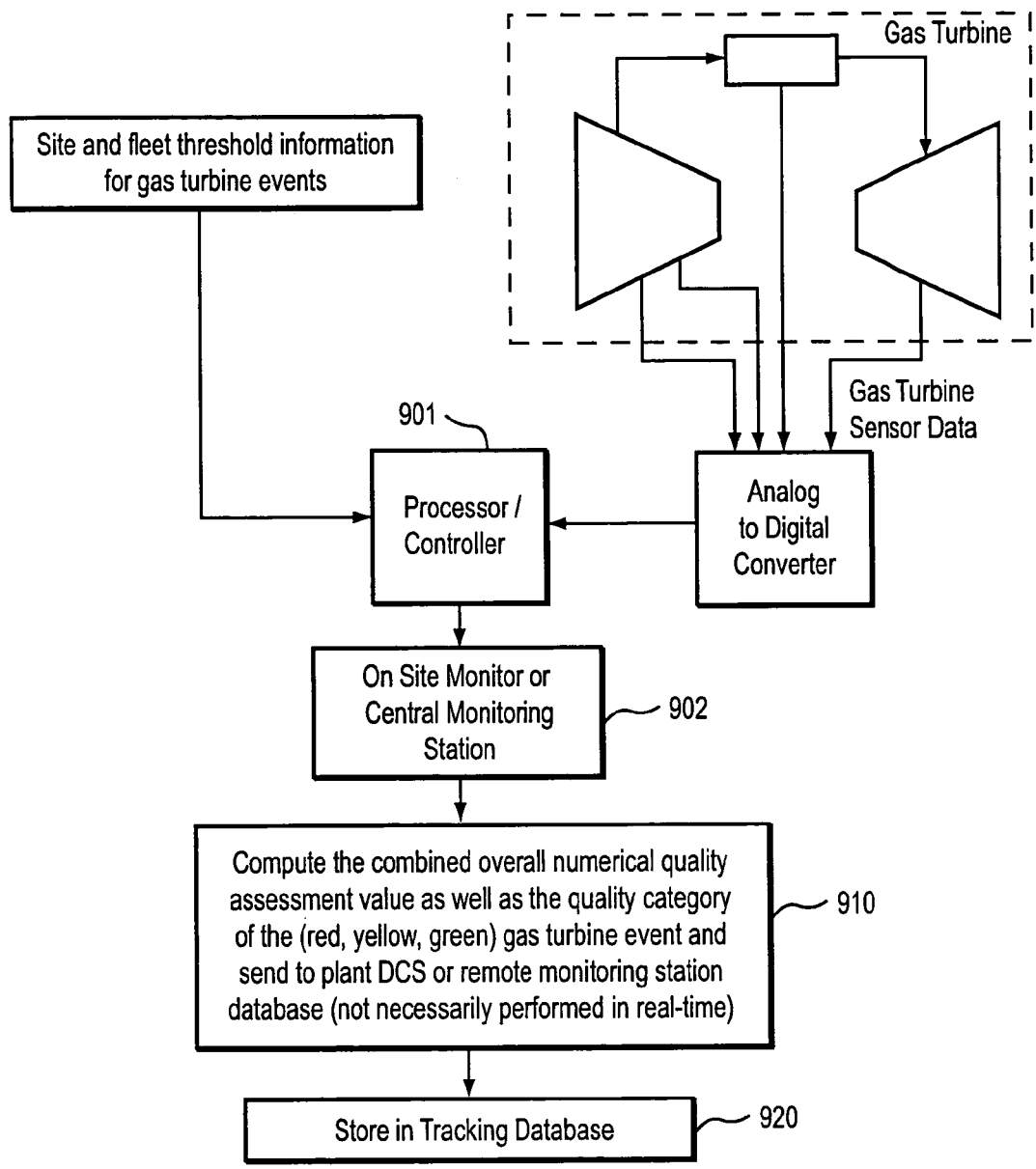
FIG. 9 is a flow diagram illustrating an example non-real-time computer processing implementation of the operational event quality assessment process for a gas turbine system that may be performed either locally or centrally.

FIG. 9 shows a flow diagram illustrating an example of a non-real-time computer processing implementation of the operational event quality assessment process for a gas turbine system. In this example, gas turbine sensor data during an operational event is provided to processor/controller 901 which stores the acquired information locally or sends it to a central server for performing further analysis at a later time. An on-site monitor/user interface 902 may be provided to provide a means for an operator to locally access, control and display the acquired data and results from any quality assessment and fault diagnostic analysis that is performed. 1002 also suggests that this function could be performed a remote central site. Unit, site and fleet signatures and threshold information are obtained from a historical event database and used in computing the combined overall quality assessment value and determining the quality category of the event, as indicated at block 910. This information may then be saved in a historical tracking database as indicated at block 920.

Figure 10:
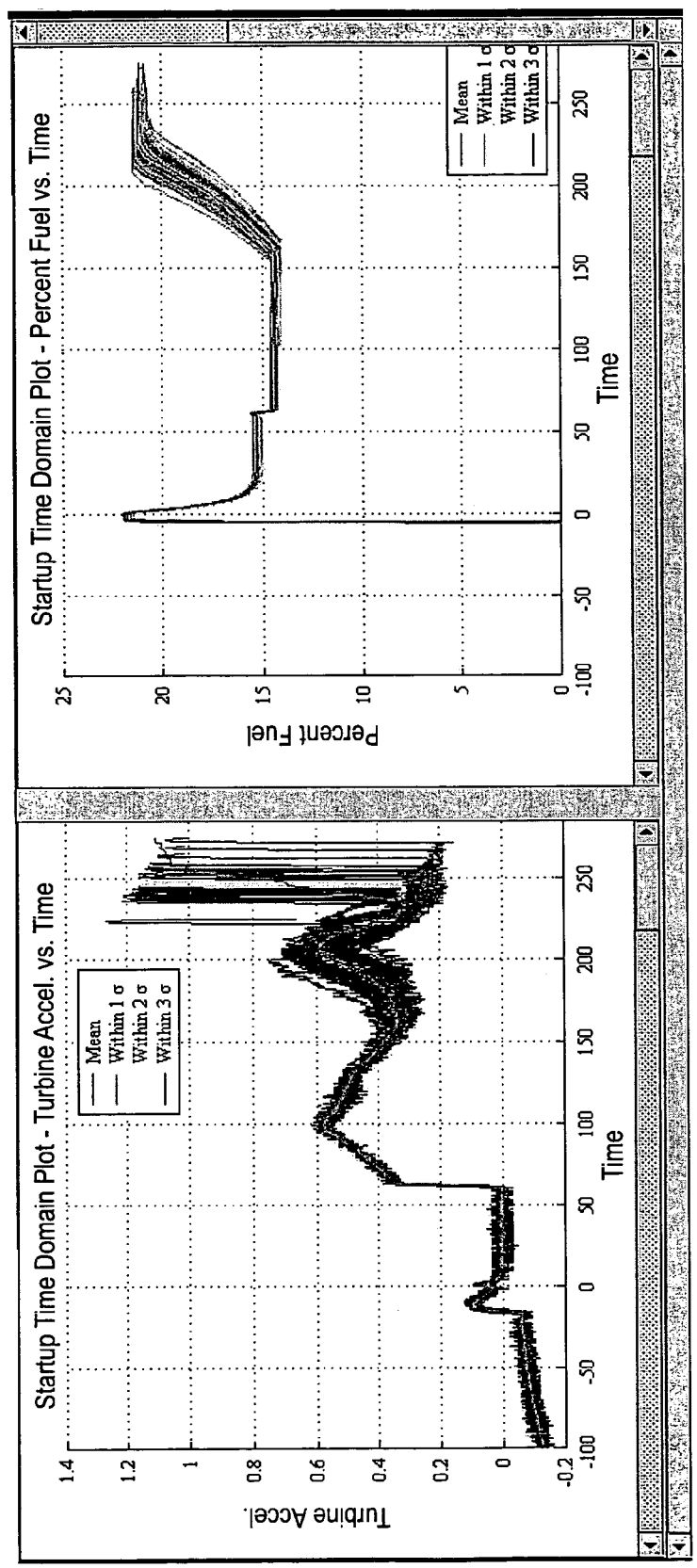
FIG. 10 is a pair of graphs illustrating examples of sub-signature signal data plots used in forming event signatures for a particular turbine machine.

FIG. 10 shows two example sets of parameter/sensor time domain sub-signature signal data plots obtained during a turbine "startup" event that are used in forming event signatures for a particular turbine machine. The left example illustrates plots of acceleration vs. time and the right example illustrates plots of percent fuel vs. time. The first action is to time align the data. As explained above, a signature is formed from a set of sub-signature data plots. Each sub-signature plot is characterized by a nominal value having associated quality thresholds boundaries/ranges (e.g., red, yellow and green) defined about the nominal value. An event signature is produced by obtaining multiple data sets and overlaying the corresponding sub-signature plots to determine the "nominal" or representative plot for each sub-signature.

Figure 11A:
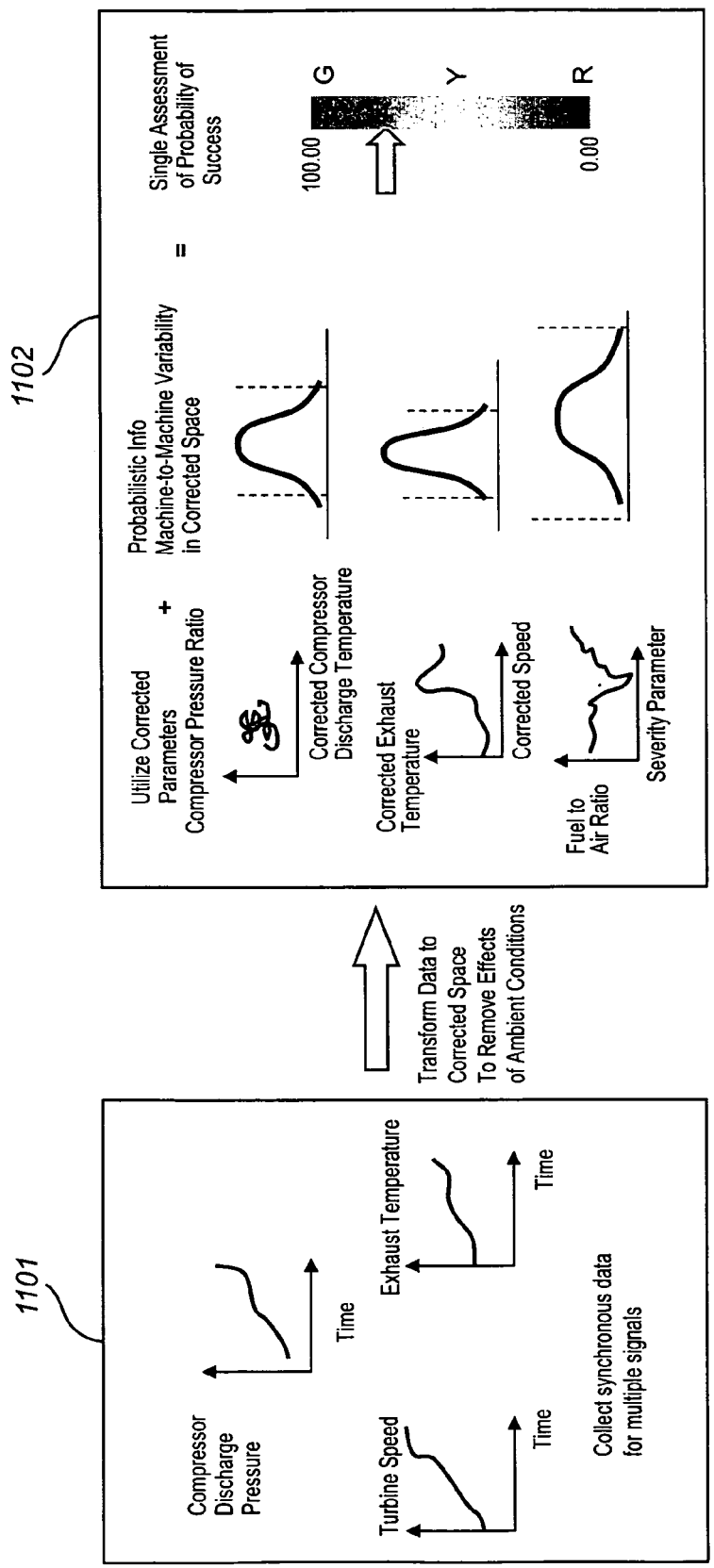
FIG. 11A is diagram illustrating the computer/controller implemented processes of collection, transformation and fusion of signal data information to provide a single unified quality assessment.

FIG. 11A shows an example diagram illustrating the computer/controller implemented processes of collection, transformation and fusion of signal data information to provide a single unified quality assessment. As shown in block 1101, multiple time domain plots of, for example, pressure, temperature, speed, etc. are developed from the data collected, and aligned in the time domain. An arrow from block 1101 to block 1102 illustrates the transformation of the data of block 1101 into a corrected parameter space to remove the effects of ambient conditions, fuel quality and/or other known causes of variability in the data. Transformed data from this corrected parameter space is used to generate X-Y virtual parameter plots, as shown in block 1102, that are effectively corrected for ambient conditions and systemic variations and will provide a statistically better indication of the underlying process. As also illustrated in block 1102, a single unified assessment of success is produced by performing a probabilistic averaging of the sub-signature assessments, as described above with respect to FIG. 6.

Figure 11B:
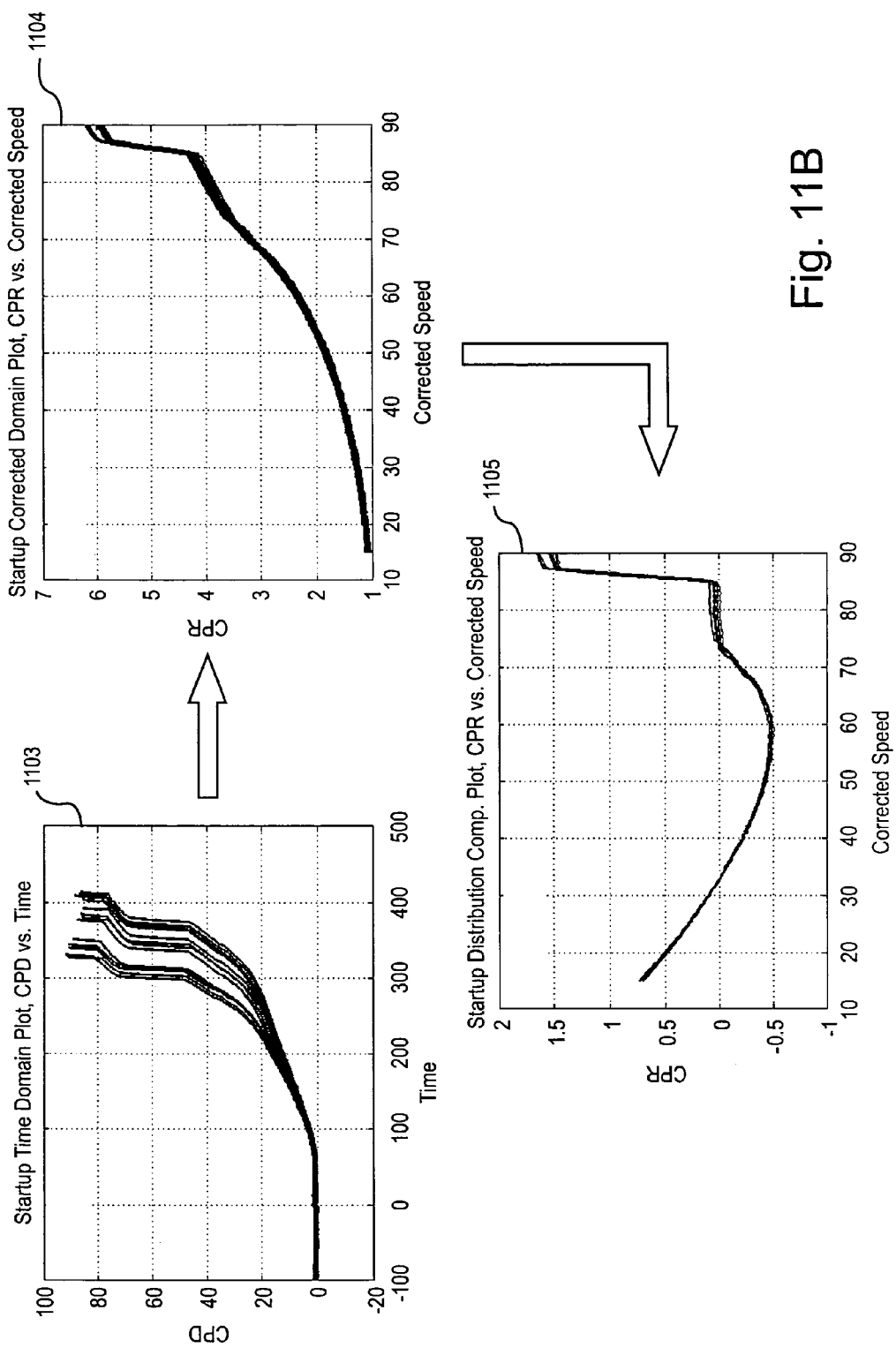
FIG. 11B is a series of graphs illustrating transformation of an example collected data set via the computer/controller implemented quality assessment processes.

FIG. 11B provides a series of graphs illustrating an example transformation of an example collected data set using the above described computer/controller implemented quality assessment processes. In this example, data from a time domain plot of compressor discharge pressure (CPD), 1103, is transformed to the corrected parameters of compressor pressure ratio (CPR) vs. corrected speed, shown in graph 1104. This is followed by the creation of the sub-signature illustrated in graph 1105. This sub-signature information is then used for producing a unified quality assessment as discussed above and illustrated in FIG. 11A. The appropriate correction (corrected parameter space) for the above example and for each data set for other operational variables, such as temperatures, fuel, etc., is developed using known conventional techniques familiar to those skilled in the art and typically involves using domain knowledge of the operational event, identifying the variables or signals that characterize the operational event and applying knowledge of the underlying physics of the operational event to determine either dimensionless quantities that characterize the event and minimize the effect of ambient conditions like temperature, pressure, humidity, etc. when plotted against another virtual variable.

The quality assessment information developed by the present computer implemented operational event quality assessment/diagnostic process may be output to a display device, a laptop or a printer. FIG. 12 shows an example of an output screen display that may be produced by the computer implemented operational event quality assessment/diagnostic process upon evaluating a turbine or other machine system operational event. In this example, the machine site, ID, equipment configuration, operational event and date information are displayed in separate columns (1201) for each event assessed. In an associated "Status" column (1202), the unified quality assessment value developed for each machine fleet, machine site and machine unit for each operational event evaluated is displayed along with a color indicator showing the corresponding quality range (e.g., red, yellow or green).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for developing a unified quality assessment of a machine system based on sensor data characterizing one or more operational events of the machine system, at least some of the sensor data having associated correction parameters, the method comprising:

acquiring sensor data corresponding to a particular operational event;

developing operational event specific signatures from parameter plots based upon acquired sensor data, at least some of the event signatures corresponding to sensor data from parameter plots corrected by utilizing one or more corrected parameter coefficients, wherein said corrected parameter coefficients reduce or eliminate variabilities in the sensor data caused by ambient operating conditions and/or fuel type or fuel quality;

classifying signatures from both corrected and uncorrected parameter plots into one of a plurality of quality assessment categories based upon a predetermined degree of statistical correspondence between a signature and a pre-determined value or range of values; and combining quality assessment evaluations of signatures corresponding to both corrected and uncorrected parameter plots to develop a single comprehensive quality assessment value indicative of the machine system operation in response to said one or more operational events.

2. The method of claim 1 wherein at least some acquired sensor data is corrected by applying a mathematical transformation which converts the data into a corrected parameter space.

3. The method of claim 1 wherein said plurality of quality assessment categories include at least one category indicative of an acceptable degree of correspondence, one category indicative of a marginally acceptable degree of correspondence and one category indicative of an unacceptable degree of correspondence.

4. The method of claim 1 further comprising:
saving a comprehensive quality assessment signature indicative of the machine system operation in response to an operational event.

5. The method of claim 1 further comprising:
developing an updated unified quality assessment value upon acquiring sensor data during each similar subsequent operational event.

6. The method of claim 1 further comprising:
identifying a predetermined amount of deviation of said updated quality assessment value from a previous or historical quality assessment value as indicative of a potential system or component failure.

7. The method of claim 1 wherein the machine system is a gas turbine system.

8. The method of claim 1 wherein the machine system is a wind turbine power generation system.

9. The method of claim 1 wherein the machine system is a fluid pumping system.

10. A method implemented on a computer for developing a comprehensive unified quality assessment and fault diagnostic of a machine system operational event, the method comprising:

acquiring sensor data corresponding to a particular operational event of the machine system;

performing a mathematical transformation on at least some of the acquired sensor data using a predetermined set of parameter correction coefficients such that known variabilities in the acquired sensor data are reduced or eliminated;

comparing acquired sensor data to a pre-determined acceptable value or range of acceptable values and determining an amount of correspondence between the acquired sensor data and said pre-determined value or range of values to within a computed statistical degree;

classifying both transformed and non-transformed sensor data into one of a plurality of quality assessment categories based upon said computed statistical degree of correspondence;

combining statistical evaluations of both transformed and non-transformed data into a single unified quality assessment value; and identifying a predetermined amount of deviation of said quality assessment value from a previously determined historical quality assessment values as indicative of a potential system or component failure.

11. The method of claim 10 further comprising:
developing a new unified quality assessment value after acquiring sensor data during a subsequent operational event, said new unified quality assessment value based at least in part on previously acquired data.

12. The method of claim 10 wherein said known variabilities in the acquired sensor data are caused by ambient operating conditions or fuel quality.

13. The method of claim 10 wherein said plurality of quality assessment categories include at least one category indicative of an acceptable degree of correspondence, one category indicative of an marginally acceptable degree of correspondence and one category indicative of an unacceptable degree of correspondence.

14. The method of claim 10 wherein the machine system is a wind turbine power generation system.

15. The method of claim 10 wherein the machine system is a gas turbine system.

16. The method of claim 10 wherein the machine system is an oil or gas pumping system.

17. Computer-readable medium having computer-executable instructions of performing a method for developing a quality assessment of a turbine system operational event, the method comprising:
   acquiring sensor data corresponding to a particular operational event of a turbine system;
   performing a mathematical transformation on at least some of said acquired sensor data using a predetermined set of parameter corrections such that variabilities in said acquired sensor data caused by ambient operating conditions or fuel type/quality are reduced or eliminated;
   comparing said acquired sensor data to a pre-determined acceptable value or range of acceptable values and determining an amount of correspondence between the acquired sensor data and said pre-determined value or range of values to within a computed statistical degree; and
   classifying both transformed and non-transformed sensor data into one of a plurality of quality assessment categories based upon said computed statistical degree of correspondence; and
   combining both transformed and non-transformed data into a single unified quality assessment value.

18. The computer-readable medium of claim 17 having computer-executable instructions for performing a method for developing a quality assessment of a turbine system operational event, the method further comprising:
   saving the unified quality assessment value;
   computing a new unified quality assessment value upon acquiring sensor data from a subsequent operational event; and
   identifying a predetermined amount of deviation of said quality assessment value from a previously computed quality assessment value or range of values as indicative of a potential system or component failure.

19. The computer-readable medium of claim 17 having computer-executable instructions for performing a method for developing a quality assessment of a turbine system operational event, wherein the method further includes computer-executable instructions for saving a plurality of unified quality assessment values and automatically identifying any deviation from previously saved values which exceeds a predetermined amount as indicative of a potential system or component failure.

20. The computer-readable medium of claim 17 having computer-executable instructions for performing a method for developing a quality assessment of a turbine system operational event, wherein said plurality of quality assessment categories include at least one category indicative of an acceptable degree of correspondence, one category indicative of an marginally acceptable degree of correspondence and one category indicative of an unacceptable degree of correspondence.

21. A method implemented on a computer for developing a quality assessment of a turbine machine event based on sensor data characterizing the operation of the turbine during the operational event, the sensor data being influenced by ambient operating conditions and known variability in fuel type/quality, the method comprising:
   acquiring turbine sensor data corresponding to a particular turbine operational event;
   correcting at least some of the sensor data, wherein variability in the data due to variations in ambient operation conditions and fuel type/quality are reduced or eliminated; and
   comparing corrected sensor data to a predetermined value or range of values; and
   classifying said data into one of a plurality of quality assessment categories according to a predetermined degree of statistical correspondence between said data and the predetermined value or range of values.

22. The method of claim 21 wherein at least some acquired sensor data is corrected by a mathematical transformation which converts said data into a corrected parameter space.

23. The method of claim 21 further comprising:
   comparing non-transformed sensor data and transformed data to a pre-determined expected value to assess the degree to which the data matches the pre-determined expected value; and
   developing a comprehensive operational event assessment based on said comparison.

24. The method of claim 21 further comprising:
   storing the developed comprehensive event assessment and performing a updated quality assessment each time additional or new sensor data is acquired.

25. A method implemented on a computer for developing a comprehensive unified quality assessment of a gat turbine system operational event, the method comprising:
   acquiring turbine sensor data which characterizes the operation of the turbine during occurrence of an operational event, wherein the acquired sensor data is affected by ambient operating conditions of the turbine and/or the fuel quality/type;
   using a predetermined mathematical transform or a set of correction parameters to transform acquired sensor data to effectively remove or reduce variability in the acquired sensor data which results from variations in ambient operating conditions at the turbine and/or fuel type/quality;
   comparing both transformed and non-transformed sensor data relevant to the operational event with a predetermined expected value or range of values and determining a statistical degree to which said transformed data and non-transformed sensor data matches the expected value or range of values;
   classifying both transformed and non-transformed sensor data into a plurality of quality categories according to the statistical degree to which the data matches the expected value or range of values;
   combining statistical evaluations of both transformed data and non-transformed data into a single unified quality assessment value that is indicative of the comprehensive quality of a particular turbine operational event; and
   continuously tracking and updating said unified quality assessment value over time and identifying when a deviation in said assessment value exceeds a predetermined threshold or range as indicative of a potential system or component failure.

* * * * *